United States Patent [19]

Bergeron

[11] 4,449,993
[45] May 22, 1984

[54] FILTER MODULE FOR DUST COLLECTOR SYSTEM

[75] Inventor: Willard Bergeron, Drummondville, Canada

[73] Assignee: Equifab, Inc., Beloeil, Canada

[21] Appl. No.: 399,496

[22] Filed: Jul. 19, 1982

[51] Int. Cl.³ .......................................... B01D 46/02
[52] U.S. Cl. ...................................... 55/379; 55/380;
55/381; 55/483; 55/484; 55/497; 55/500;
55/DIG. 12; 55/DIG. 31
[58] Field of Search .............. 55/132, 341 R, 341 NT,
55/377, 378–381, 483, 484, 497, 500, DIG. 12,
DIG. 31, 361, 369

[56] References Cited

U.S. PATENT DOCUMENTS

| 514,440 | 2/1894 | Blessing | 55/344 |
| 1,012,122 | 12/1911 | Budil | 55/379 |
| 1,708,065 | 8/1929 | Jordahl et al. | 55/319 |
| 1,754,477 | 5/1930 | Menzin | 55/344 |
| 2,325,905 | 8/1943 | Caufield | 181/268 |
| 2,502,560 | 4/1950 | Dahlman | 55/132 |
| 2,867,289 | 1/1959 | Sare | 55/287 |
| 2,907,406 | 10/1959 | Baden et al. | 55/341 R |
| 2,932,362 | 4/1960 | Roper | 55/381 |
| 3,385,033 | 5/1968 | Basore et al. | 55/302 |
| 3,396,516 | 8/1968 | Ballard | 55/302 |
| 3,401,505 | 9/1968 | Ballard | 55/341 R |
| 3,443,366 | 5/1969 | Schwab | 55/380 |
| 3,887,032 | 6/1975 | Harris | 181/273 |
| 4,129,428 | 12/1978 | Andersson et al. | 55/379 |
| 4,193,780 | 3/1980 | Cotton, Jr. et al. | 55/DIG. 12 |
| 4,227,903 | 10/1980 | Gustavsson et al. | 55/302 |
| 4,323,376 | 4/1982 | Rosenquest | 55/378 |

FOREIGN PATENT DOCUMENTS 624160   7/1927   France ............................. 55/369

Primary Examiner—David L. Lacey
Attorney, Agent, or Firm—Swabey, Mitchell, Houle, Marcoux & Sher

[57] ABSTRACT

A filter module comprises a frame bridged by a plurality of spaced-apart arch members, on which is supported a one-piece filter element comprising a plurality of pockets which each enshroud an arch member, and which connect into a mouth portion circumscribing the frame and held in position by a drawstring. The filter module is easily erected, and a seal between the inlet and outlet sides of filter equipment employing the module is easily provided.

8 Claims, 5 Drawing Figures

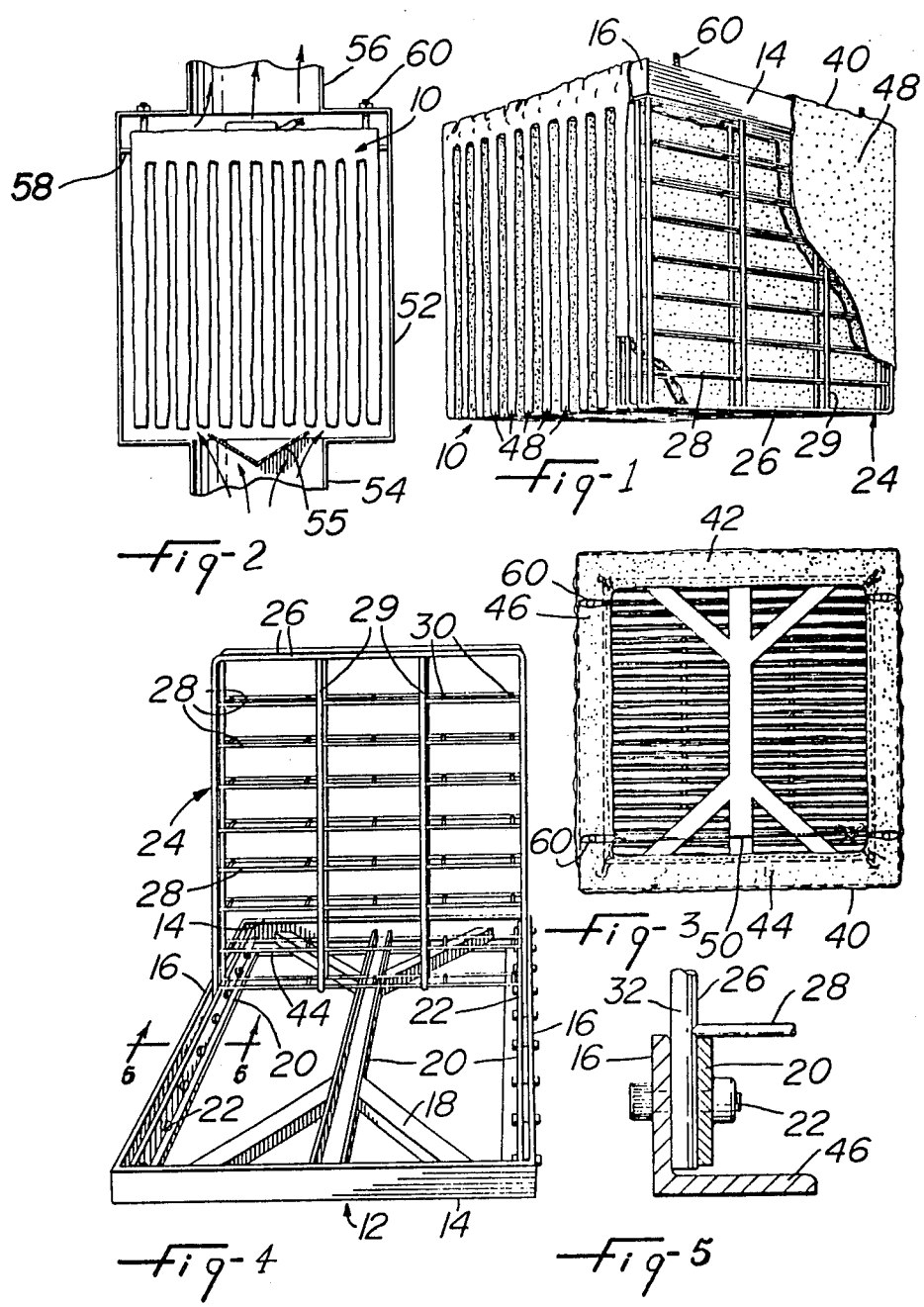

FILTER MODULE FOR DUST COLLECTOR SYSTEM

BACKGROUND OF THE INVENTION

1. Field of the Invention

This invention relates to filter apparatus such as may be used for the removal of particulate matter from fluids, especially dust-laden air.

2. Description of the Prior Art

In the field of rock drilling, the removal of rock particles from the atmosphere in the vicinity of the rock drill is particularly important in order to maintain the working area atmosphere at a reasonably dust-free level. U.S. Pat. No. 4,277,263, issued July 7, 1981 to W. Bergeron, inventor, describes a hood adapted to surround the drill head and conduit means for removing the dust-laden exhaust and thereafter separating particles from the atmosphere in the exhaust.

Various types of filter elements have been suggested including that illustrated in the above-mentioned U.S. patent.

A filter apparatus normally comprises a chamber having inlet and outlet openings and a filter element located therebetween. The capacity of the filter apparatus expressed in terms of its throughput per unit time, is directly proportional to the surface area of the filter element. In U.S. Pat. No. 1,012,122, issued Dec. 19, 1911 to A. Budil, the filter element is supported on a frame to form a module of relatively high efficiency, which is to say, a high capacity per unit volume. This is effected by forming the filter element as a plurality of individual pockets, each pocket being supported on a pocket frame, the pocket frames being in turn mounted on a main support. The invention relates to improvements in sealing between the individual pockets and the main support.

In U.S. Pat. No. 2,502,560, issued Apr. 4, 1950 to V. Dahlman, a high efficiency filter module comprises a pleated filter element mounted between opposed frame members having complementary intermeshing V-shaped fingers to sandwich opposed sides of the pleated filter element therebetween. This module appears best suited to relatively small units operating at low pressure differentials.

In U.S. Pat. No. 3,622,446, issued Nov. 23, 1971 to P. Burnham, there is shown a disposable self-supporting filter element molded from a phenol thermoset resin containing a high proportion of fibrous materials, the filter element comprising a plurality of integral pockets therein. This element also appears to be best suited for relatively small filter units.

In U.S. Pat. No. 4,129,428, issued Dec. 12, 1978 to R. Andersson et al, a filter module comprises a cloth filter element sewn to provide multiple pockets therein and supported from an external frame. Rigid pocket frames are provided to prevent the pockets from collapsing, but the pocket frames are supported from the pockets rather than the external frame. The means for sealing the filter element to the external frame is, moreover, quite complex.

SUMMARY OF THE INVENTION

It is then an object of this invention to provide improvements in high efficiency filter modules, and filter apparatus comprising said modules.

It is a further object of this invention to provide such filter modules as are well suited to large scale commercial operations.

It is another object of the invention to provide filter modules wherein the filter element is easily sealed to the support frame.

It is yet another object of this invention to provide filter modules that are relatively robust, and easily maintainable by unskilled persons.

In accordance with one aspect of the invention, a filter module comprises a frame, and a plurality of spaced-apart arch members supported from the frame to bridge over a one side thereof. A one-piece filter bag having a mouth portion generally circumscribes the frame and a plurality of pockets open into the mouth, each of the pockets enveloping an arch member.

Desirably, the filter bag is provided with a means for adjustably constricting the mouth, a drawstring or elasticated means being generally suitable, so as to urge the mouth into contact with the frame. Preferably, the mouth extends onto the other side of the frame where it is constricted.

Normally, the filter apparatus will comprise a chamber having a gas inlet and a gas outlet opening thereto, with a baffle wall therebetween to receive the wall of the frame in abutment, the mouth of the filter bag being suitably sandwiched between the baffle wall and frame wall to provide a good seal.

Generally the frame will be rectangular, and each of two laterally opposed side walls thereof may suitably comprise a first, fixed member and a second movable member interconnected therewith by a plurality of bolts at spaced intervals, the legs of the arch members being clamped between the fixed and movable members when the bolts are tightened. Desirably, the spacing between the bolts will equal the desired spacing between adjacent arch members, the bolts thereby providing suitable axial locations for the arch members.

These aspects of the invention and others, together with further objects, aims and advantages, will become apparent from the ensuing description of a preferred embodiment thereof. Such embodiment is exemplary only of the invention and is not to be considered as limiting the broad scope of the invention.

BRIEF DESCRIPTION OF THE DRAWINGS

In the drawings:

FIG. 1 shows, in perspective view, partly broken away to reveal detail, a filter module constructed in accordance with the invention;

FIG. 2 shows in schematic form, in side elevation, the filter module of FIG. 1 installed in a filter apparatus;

FIG. 3 shows the filter module of FIG. 1 in plan view from above;

FIG. 4 shows the filter module of FIG. 1 inverted with the filter element removed and only a single arch support; and FIG. 5 is a view along line 5—5 of FIG. 4.

DESCRIPTION OF THE PREFERRED EMBODIMENTS.

Considering now the drawings in detail, a filter module is identified generally by the numeral 10 therein. Filter module 10 comprises a rectangular frame 12 including end walls 14 and laterally opposed side walls 16 connecting therebetween, together with a stiffening member and braces 18 to rigidify frame 12.

Each laterally opposed side wall 16 has associated therewith on the interior side thereof a movable wall 20, a plurality of machine bolts 22 connecting between a side wall 16 and its associated movable wall 20. A plurality of arches 24 expediently formed from a welded wire construction are supported from frame 12. Arches 24 conveniently comprise a pair of U-shaped members 26 stiffened with lateral spacers 28 and upright spacers 29, interconnected by axial spacers 30. Terminal leg portions 32 of U-shaped members 26 are clamped firmly between fixed and moving walls 16, 20 of frame 12 by bolts 22, the bolts further serving to locate arches 24 axially on frame 12. Vertical location is conveniently provided by the lowest of the lateral spacers 28 which bears on wall 20.

A filter element 40 comprises a mouth portion 42 which circumscribes frame 12 and extends onto the opposed side thereof to that bridged by upstanding arches 24. Frame walls 14, 16 are inwardly turned at this opposed side at 44, 46 respectively so as to underlie and support filter element 40, and form a seal surface as will be described in greater detail. Filter element 40 further comprises a plurality of pockets 48 which open into mouth portion 42, the pockets being spaced and shaped so as to enshroud arches 24 to be supported thereon. Generally, filter element 40 will be sewn from suitable filter cloth. Filter element 40 is retained in position on its support frame by a drawstring 50 which is sewn into mouth 42 adjacent its upper extremity, and which, when tightened, partly closes mouth 42 over frame 12. It will be appreciated that it is relatively easy for unskilled persons in remote mining camps, for example, to assemble a filter module as described, to form a highly efficient yet robust unit.

Filter apparatus employing module 10 is seen in FIG. 2 to comprise a housing 52 having inlet opening 54 and outlet opening 56. A once-shaped baffle 55 is provided in the inlet opening in order to deflect the heavier particles and cause them to precipitate by gravity towards a dust removal opening (not shown) in housing 52. A baffle wall 58 is provided within housing 52, machine bolts 60 mount from frame members 46 to pass through a wall of housing 52 above baffle wall 58, serving to draw frame 12 into snug contact with baffle wall 58 and to sandwich and seal cloth filter element therebetween. It will be appreciated that FIG. 2 is somewhat schematic, and that filter apparatus may well comprise flow distributors, diffusors and vibrators, for example, as are known in the art.

I claim:

1. A filter module comprising a frame, a plurality of spaced-apart arch members supported therefrom to bridge over a one side thereof, a one-piece filter bag having a mouth portion generally circumscribing said frame and a plurality of pockets opening into the mouth, each said pocket enveloping a respective one of said arch members, said frame comprising two opposing sides and, on each side thereof, a first, fixed member and a second movable member spaced therefrom, and means for urging said movable member towards said fixed member to clamp the legs of said arch members therebetween.

2. A filter module as defined in claim 1, wherein said filter bag is provided with means for adjustably constricting the mouth thereof.

3. A filter module as defined in claim 2, wherein said filter bag extends at least partly onto the other side of said frame where it is constricted by said adjustable constricting means.

4. A filter module as defined in claim 3, wherein said frame includes inwardly turned wall portions at said other side to form a support surface for said bag.

5. A gas filter comprising the module of claims 1, 2 or 3, and further comprising a housing having inlet and outlet openings, a baffle wall intermediate said openings, means supporting said gas filter module within said housing with said frame and filter bag in sealed relation with said baffle wall.

6. A filter module as defined in claim 1, wherein said means for urging said movable member comprises a plurality of bolts located at spaced intervals between said fixed member and said movable member, said bolts further providing axial location for said arch members.

7. A filter module as defined in claim 6, wherein each said arch member comprises a pair of generally identical arch elements held in spaced relationship by axial spacers.

8. A filter module as defined in claim 7, wherein said arch members include lateral spacers each having opposing ends, the opposing ends of the lowest lateral spacer of each arch member bearing on a respective one of said movable members to provide a locating stop for said arch member on said frame.

* * * * *